J. C. BRIAN.
SEAT FOR AGRICULTURAL IMPLEMENTS.
APPLICATION FILED SEPT. 4, 1919.
1,345,830.
Patented July 6, 1920.
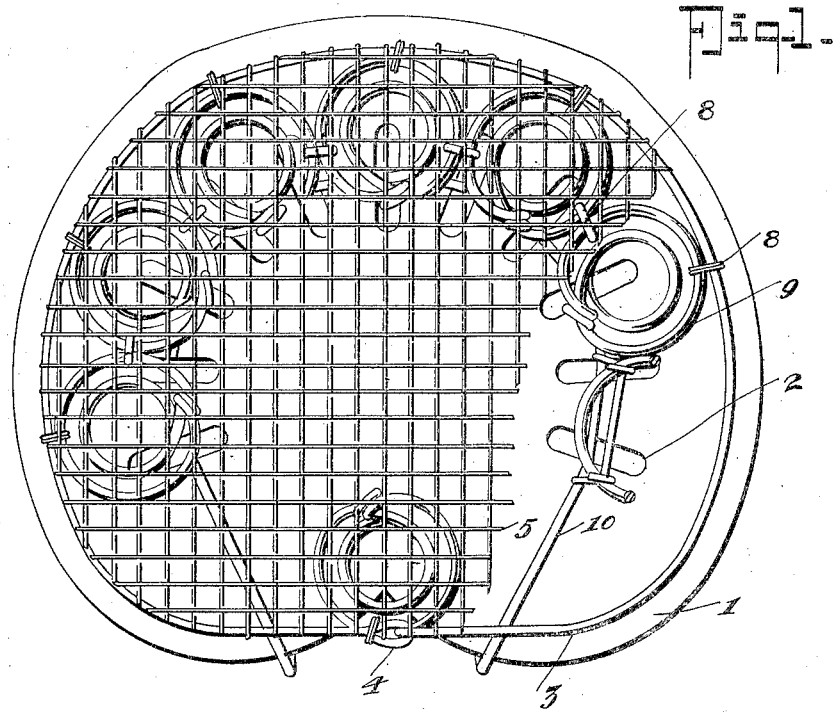
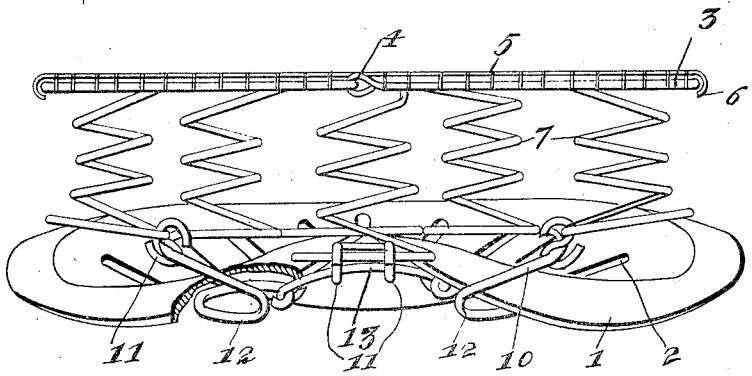
WITNESSES
Geo. V. Hall
C. E. Trainor
INVENTOR
James C Brian.
BY
ATTORNEYS

UNITED STATES PATENT OFFICE.

JAMES CHRISTOPHER BRIAN, OF MAXBASS, NORTH DAKOTA.

SEAT FOR AGRICULTURAL IMPLEMENTS.

1,345,830.     Specification of Letters Patent.     Patented July 6, 1920.

Application filed September 4, 1919. Serial No. 321,563.

*To all whom it may concern:*

Be it known that I, JAMES C. BRIAN, a citizen of the United States, and a resident of Maxbass, in the county of Bottineau and State of North Dakota, have invented certain new and useful Improvements in Seats for Agricultural Implements, of which the following is a specification.

My invention is an improvement in seats, and has for its object to provide auxiliary mechanism for use in seats of agricultural implements for cushioning said seat, to eliminate shock and jar and to diminish to a minimum the disagreeable side motion, the said auxiliary mechanism being designed to be arranged upon the usual pressed steel seat of the implement to provide a supporting surface spring supported from the seat.

In the drawings:—

Figure 1 is a top plan view of the seat; and

Fig. 2 is a front view.

In the present embodiment of the invention, the auxiliary seat is shown in connection with the usual seat 1 of pressed steel or the like, having openings 2, and the auxiliary seat comprising a frame 3 of wire or the like, formed by bending a strip of suitable length and looping the ends together as shown at 4. This ring or frame is of slightly less area than the area of the seat, so that when arranged above the same, as shown in Fig. 1, the seat will extend beyond the frame.

The frame is closed by a sheet 5 of wire cloth or the like, the edges of the sheet being bent around the ring and they may be secured thereon in any suitable or desired manner as for instance by brazing or soldering.

A series of coiled springs 7 is arranged between the frame and the seat, the said springs being the usual bed springs, each having the usual ring 9 at each end. The rings at one end are secured to the frame 3 and to the rings of adjacent springs, as indicated at 8, by wire wrappings or in any suitable manner, and the rings at the other end are anchored to the seats by an anchoring frame 10. This frame as shown is connected to the lower rings of the springs by connections 11, and the ends of the frame are hooked over the front of the seat, as indicated at 12. The hooks 12 are connected by a bar 13 beneath the seat, and this bar is connected to that spring 7, which is at the center of the front of the seat by a connection 11.

Referring to Fig. 1, it will be seen that in the present instance there are eight coiled springs, seven of which are arranged in series at the edge of the seat, extending from near the front at one side to near the front at the other, the eighth spring being at the center of the front. The connections between the frame 10 and the springs may be of any desired shape and form, being merely S-shaped hooks, as shown at the sides of Fig. 2, or a double hook as shown at the center of the figure.

It will be noticed that the auxiliary seat may be attached to the implement seat or detached therefrom when desired, merely by slipping it forwardly or backwardy with respect to the seat in a parallel plane. The elements 12 act as clamps to hold the seat in place.

I claim:

An auxiliary seat for agricultural implements, comprising an annular frame, a sheet of perforate material closing the frame, and a series of coil springs connected with the frame at the underside of the sheet inside the frame, and an attaching frame connected with the lower ends of the springs and having means for engaging the seat at the front thereof to connect the auxiliary seat to the seat.

JAMES CHRISTOPHER BRIAN.